United States Patent
Kosaka et al.

(10) Patent No.: US 8,387,125 B2
(45) Date of Patent: Feb. 26, 2013

(54) DEVICE, SYSTEM AND METHOD OF PERFORMING AN ADMINISTRATIVE OPERATION ON A SECURITY TOKEN

(75) Inventors: Masaru Kosaka, Hachioji (JP); Eran Navoth, Ramat Hasharon (IL); Gil Abel, Rishon LeZion (IL)

(73) Assignee: K.K. Athena Smartcard Solutions, Tokyo (JP)

( * ) Notice: Subject to any disclaimer, the term of this patent is extended or adjusted under 35 U.S.C. 154(b) by 1191 days.

(21) Appl. No.: 12/095,139

(22) PCT Filed: Nov. 28, 2006

(86) PCT No.: PCT/IL2006/001367
§ 371 (c)(1),
(2), (4) Date: May 28, 2008

(87) PCT Pub. No.: WO2007/063536
PCT Pub. Date: Jun. 7, 2007

(65) Prior Publication Data
US 2008/0263656 A1    Oct. 23, 2008

Related U.S. Application Data

(60) Provisional application No. 60/740,247, filed on Nov. 29, 2005.

(51) Int. Cl.
*H04L 29/06* (2006.01)
(52) U.S. Cl. ............ 726/9; 726/2; 726/3; 726/5; 726/6
(58) Field of Classification Search .............. 726/9, 2, 726/3, 5, 6
See application file for complete search history.

(56) References Cited

U.S. PATENT DOCUMENTS

| 6,662,228 | B1 | 12/2003 | Limisco | |
|---|---|---|---|---|
| 6,934,855 | B1 | 8/2005 | Kipnis et al. | |
| 2001/0027527 | A1* | 10/2001 | Khidekel et al. | 713/201 |
| 2001/0049679 | A1* | 12/2001 | Yonaitis | 707/4 |
| 2002/0031230 | A1* | 3/2002 | Sweet et al. | 380/278 |
| 2002/0046169 | A1* | 4/2002 | Keresman et al. | 705/41 |
| 2002/0099952 | A1* | 7/2002 | Lambert et al. | 713/200 |
| 2002/0169967 | A1* | 11/2002 | Varma et al. | 713/185 |
| 2002/0177433 | A1* | 11/2002 | Bravo et al. | 455/411 |
| 2003/0005308 | A1* | 1/2003 | Rathbun et al. | 713/185 |
| 2003/0068072 | A1* | 4/2003 | Hamid | 382/124 |
| 2003/0069828 | A1* | 4/2003 | Blazey et al. | 705/37 |
| 2003/0079136 | A1* | 4/2003 | Ericta et al. | 713/185 |
| 2003/0177388 | A1* | 9/2003 | Botz et al. | 713/201 |
| 2003/0200202 | A1* | 10/2003 | Hsiao et al. | 707/3 |
| 2003/0200465 | A1* | 10/2003 | Bhat et al. | 713/202 |

(Continued)

FOREIGN PATENT DOCUMENTS

EP    1 429 229 A1    6/2004

OTHER PUBLICATIONS

International Search Report for PCT/IL06/01367 mailed on Sep. 12, 2008.

(Continued)

*Primary Examiner* — Edan Orgad
*Assistant Examiner* — Bradley Holder
(74) *Attorney, Agent, or Firm* — Shichrur & Co.

(57) ABSTRACT

Some demonstrative embodiments of the invention include a method, device and/or system of performing an administrative operation on a user token. The method may include, for example, providing to an admin token user-identification data identifying the user token; receiving from the admin token an administrator code to enable performing the administrative operation; and providing the administrator code to the user token. Other embodiments are described and claimed.

18 Claims, 2 Drawing Sheets

U.S. PATENT DOCUMENTS

| | | | |
|---|---|---|---|
| 2004/0049697 A1* | 3/2004 | Edwards et al. | 713/201 |
| 2004/0058710 A1* | 3/2004 | Timmins et al. | 455/560 |
| 2004/0064708 A1* | 4/2004 | Angelo et al. | 713/185 |
| 2004/0068650 A1* | 4/2004 | Resnitzky et al. | 713/155 |
| 2004/0068653 A1* | 4/2004 | Fascenda | 713/168 |
| 2004/0073672 A1* | 4/2004 | Fascenda | 709/225 |
| 2004/0073688 A1* | 4/2004 | Sampson | 709/229 |
| 2004/0086088 A1* | 5/2004 | Naidoo et al. | 379/37 |
| 2004/0093493 A1* | 5/2004 | Bisbee et al. | 713/156 |
| 2004/0093502 A1* | 5/2004 | Shurygailo et al. | 713/183 |
| 2004/0103324 A1 | 5/2004 | Band | |
| 2004/0103325 A1* | 5/2004 | Priebatsch | 713/202 |
| 2004/0139352 A1* | 7/2004 | Shewchuk et al. | 713/201 |
| 2004/0195311 A1* | 10/2004 | Silverbrook et al. | 235/375 |
| 2005/0102509 A1 | 5/2005 | Fascenda | |
| 2005/0216732 A1 | 9/2005 | Kipnis et al. | |

OTHER PUBLICATIONS

Supplementary European Search Report for EP 06 82 1587 mailed on May 11, 2010.

Office Action for European Patent Application No. 06821587.0 mailed on Aug. 3, 2012.

Office Action for Israeli Patent Application 191422 mailed on Nov. 27, 2012.

\* cited by examiner

DEVICE, SYSTEM AND METHOD OF PERFORMING AN ADMINISTRATIVE OPERATION ON A SECURITY TOKEN

CROSS REFERENCE TO RELATED APPLICATIONS

This application is a National Phase Application of PCT International Application No. PCT/IL2006/001367, International Filing Date Nov. 28, 2006, which claims the benefit of U.S. Provisional Application No. 60/740,247, filed Nov. 29, 2005, the entire disclosures of which are incorporated herein by reference.

BACKGROUND OF THE INVENTION

A security token may be implemented in the form of a smart card, i.e., a portable medium having a semiconductor chip capable of performing desired operations and storing desired data. The semiconductor chip may have a Self Programmable One-chip Microcomputer (SPOM) architecture, which may enable securely handling multiple applications using self-programmable operations and storing data in a non-volatile memory.

The security token may be coupled by a token terminal to a station, for example, a computing platform, e.g., a Personal Computer (PC), or a cellular telephone. The token terminal may enable transferring data between the security token and the station. The token terminal may also provide the token with electrical power, and/or a clock signal, which may be needed for operating the security token.

The station or the terminal may include a user interface to receive an authentication code, e.g., a personal identification number (PIN) code, which may be used for authenticating a holder of the token.

The security token may enable performing a two-factor authentication of the user of the token, e.g., since in order to authenticate the user the user may be required to have possession of the token, as well as have the knowledge of the PIN code assigned to the token.

In order to authenticate and/or sign into a system, for example, a PC, a network, a security system of a building compound, a user may be required to couple a security token assigned personally to the user, to a token terminal of a station in the secured system. In addition, the user may have to enter a PIN code designated to the user (hereinafter referred to as "the user PIN"). The user PIN may include, for example, a series of digits and/or letters, e.g. 1, D, 4, 2.

The token may verify whether the PIN code entered by the user corresponds to the user PIN.

If a wrong PIN has been entered more than an allowed number of times, then the token may be locked, e.g., the token may not allow any additional attempts to enter the user PIN.

In order to unlock the token, a system administrator may provide the token with a second code, often referred to as "admin PIN", "PUK" or "security officer" (SO) PIN. This process may be referred to as a one-factor authentication process, since it requires only one factor for authentication, i.e., knowledge of the admin PIN.

The one-factor authentication process outlined above may pose the following security risks: (1) knowledge of the admin PIN alone is sufficient in order to unlock a locked token; and (2) once the admin PIN is used to unlock the token, the admin PIN may be exposed. In some systems a unique admin PIN may be assigned to each user of the system. Although the use of different admin PIN codes for different users may enhance the security of the system, it may be a problem to securely store the different admin PINs in the system.

An authentication method, e.g., a challenge/response procedure may be used to address problem (2) mentioned above. The challenge/response method may include transmitting information ("the challenge") from the token to the administrator. The challenge may include, for example, a random number generated by the token. The administrator may then encrypt the challenge using the admin PIN as a secret key. The administrator may then send the encrypted challenge, hereinafter referred to as "response", back to the token. The token may decrypt the response, and may authenticate the admin PIN used by the administrator by comparing the decrypted response to the challenge.

Although unlocking the user token may be the most common administration operation, all of the above may hold for any other user-related administrative operation, such as personalizing a security token.

SUMMARY OF SOME DEMONSTRATIVE EMBODIMENTS OF THE INVENTION

According to some demonstrative embodiments of the invention, a method of performing an administrative operation on a user token may include providing to an admin token user-identification data identifying the user token; receiving from the admin token an administrator code to enable performing the administrative operation; and providing the administrator code to the user token.

Although the invention is not limited in this respect, according to some demonstrative embodiments of the invention, the administrator code may include an administrator Personal-Identification-Number (PIN) code.

Although the invention is not limited in this respect, the administrative operation may include, for example, unlocking or personalizing the user token, erasing data on the user token, formatting the user token, and/or creating new data on the user token. The administrative operation may additionally or alternatively include, for example, controlling complexity rules of the user token such as, for example, defining a minimum and/or maximum number of symbols, e.g. requiring at least one uppercase, one lowercase, special symbols, and the like; defining a number of allowed trials of entering a user PIN code; defining a life cycle of the user token, e.g. setting the user token to a read-only mode, i.e. a mode in which no data may be written to the user token; terminating the user token, i.e. by disabling a user to use data stored on the user token; and the like.

According to some demonstrative embodiments of the invention, providing the user-identification data to the admin token may include transferring the user-identification data from the user token to the admin token via at least one station.

According to some demonstrative embodiments of the invention, the method may also include receiving a request message including the user identification data. Providing the administrator code may include, for example, generating a response message based on the administrator code.

According to some demonstrative embodiments of the invention, the method may include authenticating a holder of the admin token, and providing the administrator code if the holder is authenticated.

According to some demonstrative embodiments of the invention, the method may include coupling the user token to a first token terminal; and coupling the admin token to a second token terminal. For example, the first token terminal may include a token terminal of a user station, and/or the second token terminal may include a token terminal of an admin station.

According to some demonstrative embodiments of the invention, providing the administrator code to the user token may include transmitting from the admin station to the user station a transmission corresponding to the administrator code; and transferring the administrator code from the user station to the user token via the first token terminal.

According to some demonstrative embodiments of the invention, providing the user-identification data to the admin token may include transferring the user-identification data from the admin station to the admin token via the second token terminal. Receiving the administrator code from the admin token may include receiving the administrator code via the second token terminal.

Some demonstrative embodiments of the invention include an admin station to be coupled to an admin token.

According to some demonstrative embodiments of the invention, the admin station may include an admin token terminal connectable to the admin token; an admin station application to transfer to the admin token via the token terminal user-identification data identifying a user token, receive from the admin token via the token terminal an administrator code to enable performing an administrative operation on the user token, and provide an output corresponding to the administrator code. The token terminal may be used, for example, to write data to the admin token, and/or receive data from the admin token.

According to some demonstrative embodiments of the invention, the admin station application may receive a request message including the user-identification data. The output may include, for example, a response message based on the administrator code.

According to some demonstrative embodiments of the invention, the output may include a transmission to a user station connected to the user token, e.g., via a token terminal.

According to some demonstrative embodiments of the invention, the station may include a user token terminal connectable to the user token.

Some demonstrative embodiments of the invention include a security token system, which may include a user token; an admin token; and an admin station to be coupled to the admin token, transfer to the admin token user-identification data identifying the user token, receive from the admin token an administrator code to enable performing an administrative operation on the user token, and provide an output corresponding to the administrator code.

According to some demonstrative embodiments of the invention, the security token system may also include a user station connectable to the user token, wherein the output comprises a transmission to the user station.

According to some demonstrative embodiments of the invention, the admin station may be connectable to the user token.

BRIEF DESCRIPTION OF THE DRAWINGS

The subject matter regarded as the invention is particularly pointed out and distinctly claimed in the concluding portion of the specification. The invention, however, both as to organization and method of operation, together with features and advantages thereof, may best be understood by reference to the following detailed description when read with the accompanied drawings in which:

Figure 1:
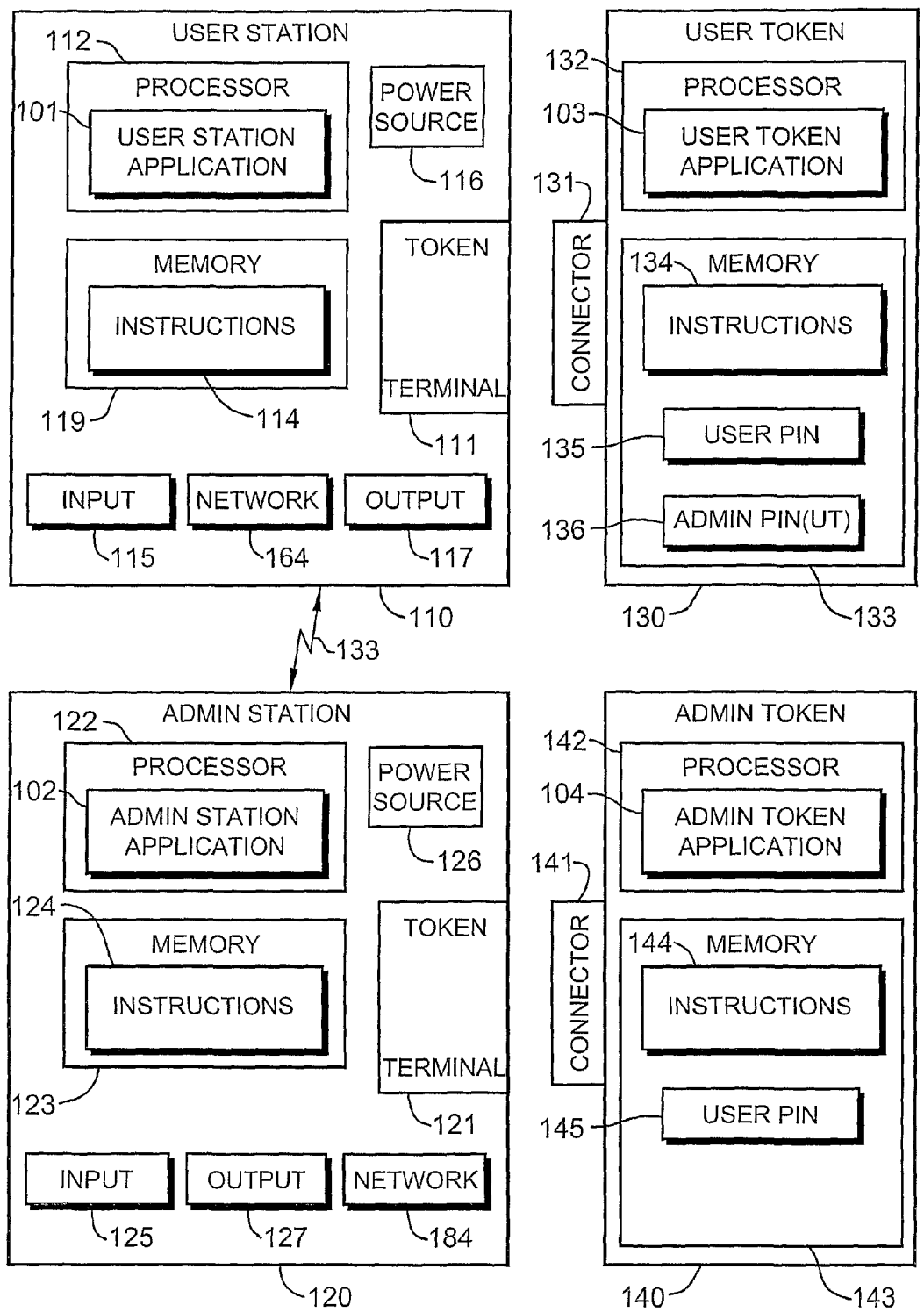
FIG. 1 schematically illustrates a security token system, in accordance with some demonstrative embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF SOME
DEMONSTRATIVE EMBODIMENTS OF THE
INVENTION

In the following detailed description, numerous specific details are set forth in order to provide a thorough understanding of the invention. However, it will be understood by those of ordinary skill in the art that the invention may be practiced without these specific details. In other instances, well-known methods, procedures, components, units and/or circuits have not been described in detail so as not to obscure the invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

Some embodiments of the invention may be implemented, for example, using a machine-readable medium or article which may store an instruction or a set of instructions that, if executed by a machine (for example, by a processor and/or by other suitable machines), cause the machine to perform a method and/or operations in accordance with embodiments of the invention. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, objectoriented, visual, compiled and/or interpreted programming language, e.g., C, C++, Java, BASIC, Pascal, Fortran, Cobol, assembly language, machine code, or the like.

It should be understood that embodiments of the invention may be used in a variety of applications. Although the invention is not limited in this regard, embodiments of the invention may be used in conjunction with many apparatuses, for example, a server, a wireless communication device, a personal computer, a desktop computer, a mobile computer, a laptop computer, a notebook computer, a Personal Digital Assistant (PDA) device, a tablet computer, a server computer, a network, a wireless network, a Local Area Network (LAN), a Wireless LAN (WLAN), a cellular telephone, a wireless telephone, a Personal Communication Systems (PCS) device, a PDA device which incorporates a wireless communication device, or the like. It is noted that embodiments of the invention may be used in various other apparatuses, devices, systems and/or networks.

Reference is made to FIG. 1, which schematically illustrates a security token system 100, in accordance with some demonstrative embodiments of the invention.

According to some demonstrative embodiments of the invention, system 100 may include at least one user station 110, which may be adapted, for example, to serve at least one user; and a security token 130, which may be assigned to the user ("the user token"), e.g., as are described in detail below.

Although the present invention is not limited in this respect, station 110 may be a portable device. Non-limiting examples of such portable devices include mobile telephones, laptop and notebook computers, PDAs, memory units, and the like. Alternatively, station 110 may be a non-portable device, such as, for example, a desktop computer.

According to some demonstrative embodiments of the invention, system 100 may include a second station 120, which may be adapted to serve a system administrator ("the admin station"); and a security token 140, which may be assigned to the administrator (the "admin token"), e.g., as are described in detail below.

Although the present invention is not limited in this respect, station 120 may be a portable device. Non-limiting examples of such portable devices include mobile telephones, laptop and notebook computers, PDAs, memory units, and the like. Alternatively, station 120 may be a non-portable device, such as, for example, a desktop computer.

According to some demonstrative embodiments of the invention, user station 110 may include a token terminal 111. Token terminal 111 may be implemented, for example, by an optical or electronic reading device, e.g., as is known in the art. Alternatively, token terminal 111 may be implemented, for example, in the form of a universal serial bus (USB) connection, and/or using any other suitable token terminal hardware and/or software, e.g., as are known in the art. User station 110 may also include a processor 112, a memory 119, an input unit 115, an output unit 117, a network connection 164, and/or any other suitable hardware and/or software components. Token terminal 111 may be adapted to write data to user token 130, and/or receive data from user token 130.

According to some demonstrative embodiments of the invention, processor 112 may include, for example, a Central Processing Unit (CPU), a Digital Signal Processor (DSP), a microprocessor, a controller, a chip, a microchip, an Integrated Circuit (IC), or any other suitable multi-purpose or specific processor or controller, e.g., as are known in the art. Input unit 115 may include, for example, a keyboard; a mouse; a touch-pad; a biometric input device, e.g., a fingerprint scanner, and/or camera for scanning a face of the user; a pointing device; and/or any other suitable input device.

According to other demonstrative embodiments of the invention, input unit 115 may be implemented as part of user token 130, e.g., using a pad reader (not shown). The pad reader may be, for example, a keyboard embedded in user token 130, e.g., as is known in the art. Implementing the input unit as part of user token 130, e.g., instead of user station 110, may result in an enhanced security, e.g., since a code entered by the user may be provided directly to user token 130.

Output unit 107 may include, for example, a Cathode Ray Tube (CRT) monitor, a Liquid Crystal Display (LCD) monitor, or other suitable monitor or display unit. Memory 119 may include, for example, a Random Access Memory (RAM), an Erasable Programmable ROM (EPROM), a Read Only Memory (ROM), a Dynamic RAM (DRAM), a Synchronous DRAM (SD-RAM), a Flash memory, a volatile memory, a non-volatile memory, a cache memory, a buffer, a short term memory unit, a long term memory unit, a hard disk drive or any other suitable storage unit.

According to some demonstrative embodiments of the invention, network connection 164 may be adapted for communicating between station 110 and station 120, e.g., over a wired or wireless communication link 133, e.g., as is known in the art. Network connection 164 may be adapted to interact with a communication network, for example, a local area network (LAN), wide area network (WAN), or a global communication network, for example, the Internet. According to some embodiments the communication network may include a wireless communication network such as, for example, a wireless LAN (WLAN) communication network. Although the scope of the present invention is not limited in this respect, the communication network may include a cellular communication network, with station 110 being, for example, a base station, a mobile station, or a cellular handset. The cellular communication network, according to some embodiments of the invention, may be a $3^{rd}$ Generation Partnership Project (3GPP), such as, for example, Frequency Domain Duplexing (FDD), Global System for Mobile communications (GSM), Wideband Code Division Multiple Access (WCDMA) cellular communication network and the like.

According to some demonstrative embodiments of the invention, memory 119 may store one or more user application instructions 114 which, when executed by processor 112, may result in a user-station application 101. Application 101 may include, for example, a connection management application, e.g., to manage a connection with token 130 and/or transfer data between station 110 and token 130. User station application 101 may also include a user interface application. The user interface application may be adapted, for example, to enable a holder of token 130 to enter a personal identification number (PIN) code, e.g., in order to authenticate the holder of token 130. The user interface may also transfer, for example, the entered PIN code to token 130, e.g., via terminal 111. The user interface application may be implemented by any suitable program, method and/or process.

According to some demonstrative embodiments of the invention, the term "PIN code" may relate to an authentication, identification, and/or verification code, key, method, mechanism and/or algorithm, which may be implemented, for example, by a string of letters, numbers, and/or symbols. Additionally or alternatively, it will be appreciated by those of ordinary skill in the art, that the PIN code may refer to any other coding and/or identification method, e.g., a biometric identification method, which may include, for example, checking a fingerprint or the like. For example, user token 130 may execute a biometric identification algorithm to verify whether, for example, a fingerprint applied by the user matches a stored fingerprint. The PIN code may be implemented using any other suitable method, for example, a code for authenticating a challenge/response, e.g., as known in the art.

According to some demonstrative embodiments of the invention, user token 130 may include a terminal connector 131, which may be adapted to interface with token terminal 111. Terminal connector 131 may include any suitable terminal connector, e.g., as is known in the art. For example, terminal connector 131 may be implemented by physical electronic contacts, e.g., a gold connector plate, as is known in the art.

According to some demonstrative embodiments of the invention, user token 130 may also include a processor 132, and/or a memory 133. Processor 132 and/or memory 133 may be implemented, for example, by a Self Programmable One-chip Microcomputer (SPOM) architecture, e.g., as is known in the art. In some demonstrative embodiments of the invention memory 133 and/or processor 132 may be protected by any suitable protection mechanism, e.g., any suitable "physical" protection structure and/or any other suitable protection configuration as is known in the art, to prevent the disclosure of any part of the contents of memory 133, to prevent any attempt to access any part of the contents of memory 133, to prevent any attempt to tamper or alter the contents of memory 133, in part or in whole, and/or to prevent any attempt to interfere with the operation processor 132 and/or memory 133. User station 130 may optionally include any other suitable hardware and/or software components, e.g., as are known in the art.

According to some demonstrative embodiments of the invention, memory 133 may store one or more user token application instructions 134, which when executed by processor 132, may result in a user token application 103, for example, an application for communicating between token 130 and station 110.

According to some demonstrative embodiments of the invention, user token application 103 may also be able, for example, to authenticate the holder of token 130, e.g., by determining whether the entered PIN code matches a PIN code 135 assigned to token 130 ("the userPIN(UT) code"). The userPIN(UT) code may include, for example, an authentication code, which may include a series of digits and/or letters, e.g., 1, D, 4, 2. User token application 103 may also be able to lock token 130, for example, if the holder has attempted to enter a predefined number of PIN codes not matching the user userPIN(UT). According to some demonstrative embodiments of the invention, memory 133 may optionally store userPIN(UT) code 135. In other embodiments the user PIN code may not be stored in memory 133.

According to some demonstrative embodiments of the invention, user token application 103 may also enable an authorized user, e.g., a system administrator, to administrate one or more user-related operations to token 130, e.g., after authenticating the authorized user. For example, application 103 may be able to compare a PIN code received from station 110 to an admin PIN code, denoted adminPIN(UT) 136, assigned to token 130, e.g., as described below. According to some demonstrative embodiments of the invention, memory 133 may optionally store adminPIN(UT) 136. In other embodiments the adminPIN(UT) code may not be stored in memory 133.

According to some demonstrative embodiments of the invention, admin station 120 may include a token terminal 121. Token terminal 121 may be implemented, for example, by an optical or electronic reading device, e.g., as is known in the art. Alternatively, token terminal 121 may be implemented in the form of, for example, a USB connection, and/or using any other suitable hardware and/or software, e.g., as is known in the art. Admin station 120 may also include a processor 122, a memory 123, an input unit 125, an output unit 127, a network connection 184, and/or any other suitable hardware and/or software components. Token terminal 121 may be adapted, for example, to transfer data to admin token 140, e.g., write data to admin token 140; and/or to transfer data received from admin token 140 to admin station 120.

According to some demonstrative embodiments of the invention, processor 122 may include, for example, a CPU, a DSP, a microprocessor, a controller, a chip, a microchip, an IC, or any other suitable multi-purpose or specific processor or controller, e.g., as are known in the art. Input unit 125 may include, for example, a keyboard; a mouse; a touch-pad; a biometric input device, e.g., a fingerprint scanner, and/or camera for scanning a face; a pointing device and/or any other suitable input device.

According to other demonstrative embodiments of the invention, input unit 125 may be implemented as part of admin token 140, e.g., using a pad reader. The pad reader may be, for example, a keyboard embedded in admin token 140, e.g., as is known in the art. Implementing the input unit as part of admin token 140, e.g., instead of admin station 120, may result in an enhanced security, e.g., since a code entered by the administrator may be provided directly to admin token 140. Output unit 107 may include, for example, a CRT monitor, a LCD monitor, or other suitable monitor or display unit. Memory 123 may include, for example, a RAM, an EPROM, a ROM, a DRAM, a SD-RAM, a Flash memory, a volatile memory, a non-volatile memory, a cache memory, a buffer, a short term memory unit, a long term memory unit, a hard disk drive or other suitable non-removable storage units or other suitable memory units or storage units.

According to some demonstrative embodiments of the invention, network connection 184 may be implemented for communicating between station 120 and station 110, e.g., over communication link 133, e.g., as is known in the art. Network connection 184 may be adapted to interact with a communication network, for example, a LAN, WAN, or a global communication network, for example, the Internet. According to some embodiments the communication network may include a wireless communication network such as, for example, a WLAN communication network. Although the scope of the present invention is not limited in this respect, the communication network may include a cellular communication network, with station 120 being, for example, a base station, a mobile station, or a cellular handset. The cellular communication network, according to some embodiments of the invention, may be a 3GPP, such as, for example, FDD, GSM, WCDMA cellular communication network and the like.

According to some demonstrative embodiments of the invention, memory 123 may store one or more admin station application instructions 124 which, when executed by processor 122, may result in an admin station application 102, e.g., as described in detail below.

According to some demonstrative embodiments of the invention, admin station application 102 may include, for example, a connection management application, e.g., to manage connecting and/or transferring data between station 120 and token 140. Admin station application 102 may also include a user interface application. The user interface application may be adapted, for example, to enable a holder of token 140 to enter a PIN code, e.g., in order to authenticate the holder of token 140. The user interface application may also transfer, for example, the entered PIN code to token 140, e.g., via terminal 121. The user interface application may be implemented by any suitable program, method and/or process.

According to some demonstrative embodiments of the invention, admin token 140 may include a terminal connector 141, which may be adapted to interface with token terminal 121. Terminal connector 141 may include any suitable terminal connector, e.g., as is known in the art. For example, terminal connector 141 may be implemented by physical electronic contacts, e.g., a gold connector plate, as is known in the art.

According to some demonstrative embodiments of the invention, admin token 140 may also include a processor 142, and/or a memory 143. Processor 142 and/or memory 143 may be implemented, for example, by a SPOM architecture, e.g., as is known in the art. In some demonstrative embodiments of the invention memory 143 and/or processor 142 may be protected by any suitable protection mechanism, e.g., any suitable "physical" protection structure and/or any other suitable protection configuration as is known in the art, to prevent the disclosure of any part of the contents of memory 143, to prevent any attempt to access any part of the contents of memory 143, to prevent any attempt to tamper or alter the contents of memory 143, in part or in whole, and/or to prevent any attempt to interfere with the operation processor 142 and/or memory 143.

According to some demonstrative embodiments of the invention, memory 143 may store one or more admin token application instructions 144, which when executed by processor 142, may result in an admin token application 104, for example, an application for communicating between token 140 and station 120.

According to some demonstrative embodiments of the invention, admin token application 104 may also be able, for example, to authenticate the holder of token 140, e.g., by determining whether the entered PIN code matches a PIN code assigned to token 140 ("the userPIN(AT) code"). According to some demonstrative embodiments of the invention, memory 133 may optionally store the userPIN(AT) code 145. In other embodiments the admin PIN code may not be stored in memory 143. Admin token 140 may optionally include any other hardware components and/or software components, e.g., as known in the art.

According to some demonstrative embodiments of the invention, admin token application 104 may be adapted to determine an administrator value or code, ("the admin PIN code"), corresponding to user token 130. For example, application 104 may determine the admin PIN code, e.g., based on an identification (ID) of user token 130, denoted ID(UT), e.g., as described below. Application 104 may execute, for example, an algorithm, denoted ClacKey(ID(UT)), to determine the admin PIN code corresponding to user token 130 based on ID(UT), a table stored in memory 143, and/or any other suitable data.

In some demonstrative embodiments of the invention, the admin PIN code may correspond, for example, to a predefined group of a plurality of user tokens. Alternatively, application 104 may determine a different admin PIN code for each user token.

According to some demonstrative embodiments of the invention, application 102 may be able to receive a request for an admin PIN code corresponding to token 130 ("the request"), e.g., as described below with reference to FIG. 2. In one example, application 101 may generate the request, and transmit the request to station 120 via link 133, e.g., if token 130 has been locked or in order to enable administrating any other user-related operation to token 130. The request may include for example, the ID of user token 130. In another example, the identification of user token 130 may be provided directly by the user, e.g. via telephone or electronic mail. Application 120 may transfer the ID of user token 130 to application 104, via terminal 121 and connection 141. Application 104 may determine the admin PIN code corresponding to the ID of token 130 ("the determined admin PIN"). Application 104 may also transfer the determined admin PIN to application 102, e.g., via connector 141 and terminal 121. Application 102 may transfer the determined admin PIN code to application 103, e.g., via link 133 and station 110. In some demonstrative embodiments of the invention, token 130 and/or token 140 may not include an internal power supply source. Electrical power may be supplied to tokens 130 and/or 140 by a power source associated with stations 110 and/or 120, respectively. For example, electrical power may be supplied to token 130 by a power source 116, e.g., via terminal 111; and/or electrical power may be supplied to token 140 by a power source 126, e.g., via terminal 121. Power sources 116 and/or 126 may be internal or external to stations 110 and/or 120, respectively. A clock signal may also be provided to tokens 130 and/or 140 by stations 110 and/or 120, respectively. For example, processors 112 and/or 122 may provide tokens 130 and/or 140 with respective clock signals, e.g., via terminals 111 and/or 121, respectively, as is known in the art.

Some demonstrative embodiments of the invention, e.g., as are described above with reference to FIG. 1, may relate to a system, e.g., system 100, including a first station, e.g., station 110, to be coupled to a user token, e.g., token 130, via a first token terminal, e.g., terminal 111; and a second station, e.g., station 120, to be coupled to an admin token, e.g., token 140, via a second token terminal, e.g., terminal 121. However, it will be appreciated by those skilled in the art that other embodiments of the invention may relate to a system including any other suitable configuration to communicate with the user and admin tokens. In one demonstrative embodiment, the system may include a single station able to be coupled to both the user token and the admin token. For example, the station may include a first token terminal to be coupled to the user token, and a second token terminal to be coupled to the admin token. In one non-limiting example, the single station may include a PC having a token terminal configured to be coupled to two or more tokens.

According to some demonstrative embodiments of the invention, system 100 may enable an authorized user, for example, an authenticated holder of token 140, e.g., a system administrator, to perform one or more administrative operations on token 130, e.g., as described below. For example, the system administrator may enable unlocking token 130.

Some demonstrative embodiments of the invention are described herein with reference to enabling the unlocking of a user token, e.g., by a system administrator. However, it will be appreciated by those skilled in the art that the invention is not limited in this respect, and that other embodiments of the invention may be implemented to perform any other suitable administrative operation to the user token. For example, the administrative operation may include erasing data on the user token, formatting the user token, and the like. Additionally/or alternatively the administrative operation may include, for example, controlling complexity rules of the user token such as, for example, defining a minimum and/or maximum number of symbols of the user PIN code, e.g. requiring at least one uppercase, one lowercase, special symbols, and the like; and/or defining a number of allowed trials of entering the user PIN code. Additionally/or alternatively the administrative operation may include, for example, defining a life cycle of the user token, e.g. setting the token into a read-only mode, i.e. such that no data may be written to the user token; terminating the user token, i.e. such that a user may not use data stored on the user token; performing a biometric enrolment operation, e.g., storing and/or updating user biometric data; and the like.

According to some demonstrative embodiments of the invention, the user of token 130 may couple token 130 to station 110, for example, by coupling connector 131 to terminal 111, e.g., as is known in the art. In order to authenticate the user, the user may enter, e.g., via the user interface application of station 110, a PIN code. The entered PIN code may be transferred from station 110 to token 130. User token application 103 may compare the entered PIN code to the userPIN(UT). The user may be authenticated, e.g., if the entered PIN code is determined to match the userPIN(UT).

Token 130 may be locked, e.g., by application 103, for example, if the user enters incorrect PIN codes more than a predefined allowed number of attempts.

According to some demonstrative embodiments of the invention, admin station application 102 may be able to request from admin token 140 the admin PIN code corresponding to token 130, and provide the admin PIN code to token 130, e.g., via station 110, e.g., as described in detail below.

Figure 2:
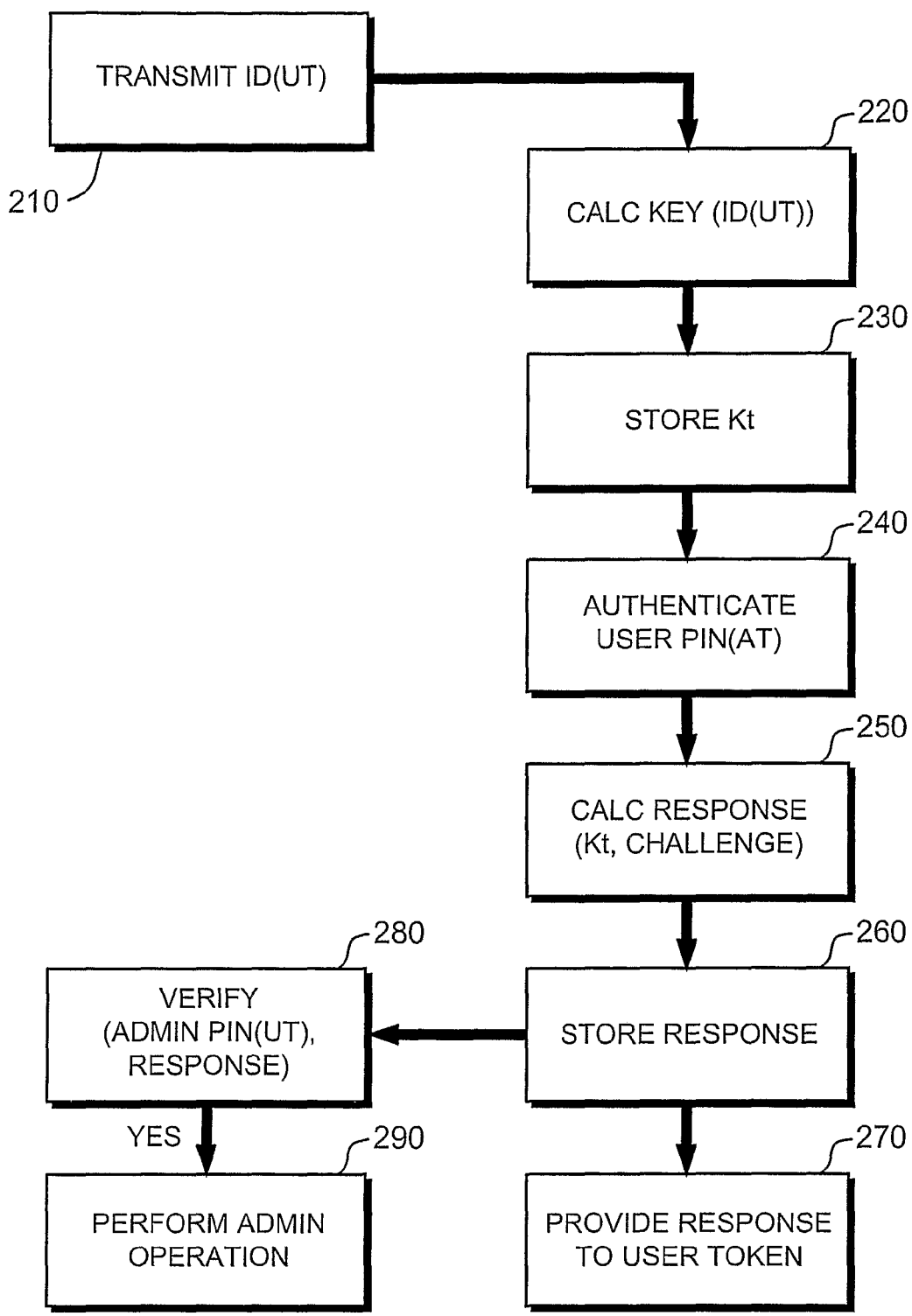
FIG. 2 schematically illustrates a flow-chart of a method of performing an administrative operation to a security token, in accordance with some demonstrative embodiments of the invention.

Reference is made to FIG. 2, which is schematically illustrates a method of performing an administrative operation to a user token, in accordance with some demonstrative embodiments of the invention. Although the invention is not limited in this respect, the method of FIG. 2 may be implemented by one or more elements of system 100 (FIG. 1) in order, for example, to perform an administrative operation to token 130 (FIG. 1), e.g., enabling the unlocking of token 130 (FIG. 1).

As indicated at block 210, according to some demonstrative embodiments of the invention, the method may include transmitting user-identification data representing an ID of the user token. The user-identification data may include any suitable data, e.g., an ID number or code, able to indicate to the admin token the identity of the user token.

Although the invention is not limited in this respect, the user-identification data may be transmitted by the user station in the form of a challenge. For example, the method may also include performing a challenge/response procedure for communicating between the user token and the admin token, e.g., as known in the art. User token application 103 (FIG. 1) may generate, for example, a challenge, e.g., including a random number. The challenge may be transmitted, for example, from user station 110 (FIG. 1) to admin station 120 (FIG. 1), e.g., via link 133 (FIG. 1).

As indicated at block 220, the method may also include determining the admin PIN code corresponding to the user token, e.g., based on the user-identification data. Although the invention is not limited in this respect, the method may also include receiving the user-identification data at the admin token. For example, the user-identification data may be transmitted by user station 110 (FIG. 1) to admin station 120 (FIG. 1), e.g., via link 133 (FIG. 1). Admin station application 102 (FIG. 1) may transfer, for example, the user identification data to admin token application 104 (FIG. 1). Admin token application 104 (FIG. 1) may determine the admin PIN code corresponding to the user identification data.

As indicated at block 230, the method may include storing the admin PIN code, e.g., temporarily. The admin PIN code corresponding to the user token may be stored, for example, by the admin token, e.g., internally. For example, application 104 may store the admin PIN code as a temporary key, denoted kT, e.g., in memory 143 (FIG. 1).

As indicated at block 240, the method may also include authenticating the user of the admin token. In one example, authenticating the user of the admin token may be performed after transmitting the user-identification by the user station and/or receiving the user-identification data at the admin token. In another example, authenticating the user of the admin token may be performed before transmitting the user-identification by the user station and/or receiving the user-identification data at the admin token. Authenticating the user of the admin token may include, for example, comparing a PIN code entered by the user of the admin token to the userPIN(AT). For example, admin token application 104 (FIG. 1) may compare the PIN code received from the user of token 140 (FIG. 1) to the userPIN(AT).

As indicated at block 250, if a challenge message was received from the user token, the method may also include determining a response message ("RESP"), e.g., based on the adminPIN(UT) and the challenge message. The response may be determined using any suitable method or process, e.g., as is known in the art. For example, admin token application 104 (FIG. 1) may generate the response message by encrypting the challenge message using the admin PIN code as a secret key.

As indicated at block 260, the method may optionally include storing the response message, e.g., temporarily. For example, admin token application 104 (FIG. 1) may store the response message in memory 143 (FIG. 1).

As indicated at block 270, the method may also include providing the user token with the admin PIN code corresponding to the user token. For example, the method may include providing the response message to the user token, e.g., in response to challenge. For example, admin token application 104 (FIG. 1) may transfer the response message to user token application 103 (FIG. 1) via station 120 (FIG. 1), link 133 (FIG. 1), and/or station 110 (FIG. 1). The method may alternatively include transferring the admin PIN code to the user station, e.g., if a challenge/response process is not implemented.

As indicated at block 280, the method may also include verifying the admin PIN received from the admin token. For example, user token application 103 may verify the response message, e.g., using any suitable challenge/response verification method or algorithm, e.g., as are known in the art. For example, user token application 103 may decrypt the response message, e.g., using the adminPIN(UT) code, and compare the decrypted message to the challenge message.

As indicated at block 290, the method may also include performing, or enabling to perform, an administrative operation to the user token, e.g., if the received admin PIN code is verified. For example, user token application 103 may unlock token 130.

It will be appreciated by those skilled in the art, that any combination of all or part of the actions described above with reference to FIG. 2 may be implemented to perform an administrative operation to a user token, according to embodiments of the invention. Further, other actions or series of actions may be used.

It will be appreciated by those skilled in the art that the method described above with reference to FIG. 2 may enable performing a two-factor authentication before performing the administrative operation to the user token, e.g., since both possession of the admin token, as well as the knowledge of the PIN code assigned to the admin token are required in order to enable providing to the user token the admin PIN code corresponding to the adminPIN(UT) code.

Embodiments of the present invention may be implemented by software, by hardware, or by any combination of software and/or hardware as may be suitable for specific applications or in accordance with specific design requirements. Embodiments of the present invention may include units and sub-units, which may be separate of each other or combined together, in whole or in part, and may be implemented using specific, multi-purpose or general processors, or devices as are known in the art. Some embodiments of the present invention may include buffers, registers, storage units and/or memory units, for temporary or long-term storage of data and/or in order to facilitate the operation of a specific embodiment.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A method of implementing an administrator code for performing an administrative operation on a user token device assigned to a user, wherein the user token is configured to enable an attempt to perform the administrative operation on the user token only if the user token authenticates the attempt according to the administrator code assigned to the user token, the method comprising:
   authenticating a holder of an admin token device based on an authentication code assigned to the admin token;
   receiving by the admin token a user-token message generated by said user token;
   based on a content of the user-token message, automatically determining by the admin token the administrator code assigned to the user token, wherein determining the administrator code assigned to the user token comprises internally calculating the administrator code by said admin token based on the content of said user-token message, and wherein said administrator code comprises a code for authenticating an attempt to perform at least one operation selected from the group consisting of securely storing data on said user token, modifying data securely stored on said user token, unlocking said user token, assigning to said user token a user code to authenticate a user of said user token, modifying said user code, personalizing said user token, formatting said user token, controlling complexity rules of said user token, defining a number of allowed trials of entering said user code to said user token, defining a life cycle of said user token, and terminating said user token; and
   outputting from said admin token an output including a response message, which is based on the administrator code assigned to said user token, to enable performing said administrative operation on said user token upon authenticating said administrator code by said user token.

2. The method of claim 1, wherein receiving said user-token message comprises transferring said user-token message from said user token to said admin token via at least one station.

3. The method of claim 1 comprising:
   coupling said user token to a first token terminal; and
   coupling said admin token to a second token terminal.

4. The method of claim 3, wherein coupling said user token to said first token terminal comprises coupling said user token to a token terminal of a first station, and wherein coupling said admin token to said second token terminal comprises coupling said admin token to a token terminal of second station, the method comprising:
   transmitting from said second station to said first station a transmission corresponding to said administrator code; and
   transferring said transmission from said first station to said user token via said first token terminal.

5. The method of claim 3 comprising transferring said user-token message from a station to said admin token via said second token terminal, and receiving said output at said station via said second token terminal.

6. The method of claim 1 comprising performing said administrative operation on said user token upon authenticating said administrator code by said user token.

7. The method of claim 1, wherein said administrator code comprises an administrator personal-identification-number code.

8. An admin station to be coupled to an admin token, said station comprising:
   an admin token terminal connectable to said admin token; and
   an admin station application to transfer to said admin token via said admin token terminal an authentication code assigned to the admin token to enable the admin token to authenticate a holder of said admin token, and a user-token message generated by a user token, the user token is configured to allow an attempt to perform an administrative operation on the user token only if the user token authenticates the attempt according to an administrator code assigned to the user token; to receive from said admin token via said token terminal an input including a response message, which is based on the administrator code assigned to said user token, which is internally determined by said admin token based on the content of said user-token message, wherein said administrator code comprises a code for authenticating an attempt to perform at least one operation selected from the group consisting of securely storing data on said user token, modifying data securely stored on said user token, unlocking said user token, assigning to said user token a user code to authenticate a user of said user token, modifying said user code, personalizing said user token, formatting said user token, controlling complexity rules of said user token, defining a number of allowed trials of entering said user code to said user token, defining a life cycle of said user token, and terminating said user token; and to provide an output to enable performing said administrative operation on said user token upon authenticating said attempt by said user token.

9. The station of claim 8, wherein said admin station application is able to receive a request message including said user-token message.

10. The station of claim 8, wherein said output comprises a transmission to a user station connected to said user token.

11. The station of claim 8 comprising a user token terminal connectable to said user token.

12. The station of claim 8, wherein said administrator code comprises an administrator personal-identification code.

13. A security token system comprising:
   an admin token device assigned to an administrator of one or more user tokens, at least one user token of said user tokens is configured to allow an attempt to perform an administrative operation on the user token only if the user token authenticates the attempt according to an administrator code assigned to the user token,
   wherein said admin token is configured to authenticate said administrator based on an authentication code assigned to the admin token; to receive a user-token message generated by said user token; based on a content of the user-token message, to securely determine within said admin token the administrator code assigned to the user token, wherein determining the administrator code assigned to the user token comprises internally calculating the administrator code by said admin token based on the content of said user-token message, and wherein said administrator code comprises a code for authenticating an attempt to perform at least one operation selected from the group consisting of securely storing data on said user token, modifying data securely stored on said user token, unlocking said user token, assigning to said user token a user code to authenticate a user of said user token, modifying said user code, personalizing said user token, formatting said user token, controlling complexity rules of said user token, defining a number of allowed trials of entering said user code to said user token, defining a life cycle of said user token, and terminating said user token; and to output from said admin token an output including a response message, which is based on the administrator code assigned to said user token, to enable performing said administrative operation on said user token upon authenticating said administrator code by said user token.

14. The security token system of claim 13, wherein said admin token is able to receive a request message including said user-token message.

15. The security token system of claim 13 comprising a station connectable to said user token and said admin token.

16. The security token system of claim 13, wherein said admin token is able to internally calculate the administrator code by applying a predefined function to the content of said user-token message.

17. The security token system of claim 13, wherein said administrator code comprises an administrator personal-identification code.

18. The security token system of claim 13, wherein at least one of said admin token and said user token comprises a smartcard.

* * * * *